(12) United States Patent
Galanter et al.

(10) Patent No.: US 6,511,326 B1
(45) Date of Patent: Jan. 28, 2003

(54) ADAPTIVE EVALUATION METHOD AND ADAPTIVE EVALUATION APPARATUS

(75) Inventors: Eugene Galanter, Union Dale, PA (US); Michelle Galanter, New York, NY (US)

(73) Assignee: Children's Progress, Inc., New York, NY (US)

( * ) Notice: Subject to any disclaimer, the term of this patent is extended or adjusted under 35 U.S.C. 154(b) by 0 days.

(21) Appl. No.: 09/604,130

(22) Filed: Jun. 27, 2000

(51) Int. Cl.[7] .................................................. G09B 7/00
(52) U.S. Cl. ......................................... 434/322; 434/156
(58) Field of Search ................................ 434/350, 322, 434/323, 362, 157, 156, 185

(56) References Cited

U.S. PATENT DOCUMENTS

| | | | | |
|---|---|---|---|---|
| 5,456,607 A | * | 10/1995 | Antoniak .................... 434/323 |
| 5,813,863 A | * | 9/1998 | Sloane et al. ............... 434/236 |
| 5,999,909 A | * | 12/1999 | Rakshit et al. ................. 705/2 |
| 6,108,515 A | * | 8/2000 | Freeman ...................... 434/321 |
| 6,120,297 A | * | 9/2000 | Morse, III et al. .......... 434/169 |
| 6,146,147 A | * | 11/2000 | Wasowicz .................... 434/169 |
| 6,234,802 B1 | * | 5/2001 | Pella et al. ................... 434/156 |

* cited by examiner

*Primary Examiner*—Joe H. Cheng
*Assistant Examiner*—Kathleen M Christman
(74) *Attorney, Agent, or Firm*—Kenyon & Kenyon (57) ABSTRACT

An evaluation method presents a series of question to an evaluated person. The questions represent a matrix of tracks and items. The questions are presented in order of increasing difficulty along a selected track until a first condition occurs. After the first condition occurs, a new track is selected, and the questions along the newly selected track are presented in order of increasing difficulty until a second condition occurs. The new track selection and question presentation are repeated until a third condition occurs. The questions may be defined by a prime question and a series of subcomponents, which represent alternate presentations of the prime question. The results of the evaluation performed are assembled from sentence fragments corresponding to the prime question and series of subcomponents and are presented in a narrative form.

54 Claims, 5 Drawing Sheets

FIG. 1 (Prior Art)

|     | $I_1$ | $I_2$ | $I_3$ | $I_4$ | $\cdots$ | $I_N$ |
| --- | --- | --- | --- | --- | --- | --- |
| $T_1$ | $Q_{1,1}$ | $Q_{1,2}$ | $Q_{1,3}$ | $Q_{1,4}$ | $\cdots$ | $Q_{1,N}$ |
| $T_2$ | $Q_{2,1}$ | $Q_{2,2}$ | $Q_{2,3}$ | $Q_{2,4}$ | $\cdots$ | $Q_{2,N}$ |
| $T_3$ | $Q_{3,1}$ | $Q_{3,2}$ | $Q_{3,3}$ | $Q_{3,4}$ | $\cdots$ | $Q_{3,N}$ |
| $T_4$ | $Q_{4,1}$ | $Q_{4,2}$ | $Q_{4,3}$ | $Q_{4,4}$ | $\cdots$ | $Q_{4,N}$ |
| $\vdots$ | $\vdots$ | $\vdots$ | $\vdots$ | $\vdots$ |  | $\vdots$ |
| $T_M$ | $Q_{M,1}$ | $Q_{M,2}$ | $Q_{M,3}$ | $Q_{M,4}$ | $\cdots$ | $Q_{M,N}$ |

ADAPTIVE EVALUATION METHOD AND ADAPTIVE EVALUATION APPARATUS

FIELD OF THE INVENTION

The present invention relates generally to an evaluation method and an evaluation apparatus. More particularly, the present invention relates to an adaptive evaluation method and an adaptive evaluation apparatus.

BACKGROUND INFORMATION

Figure 1:
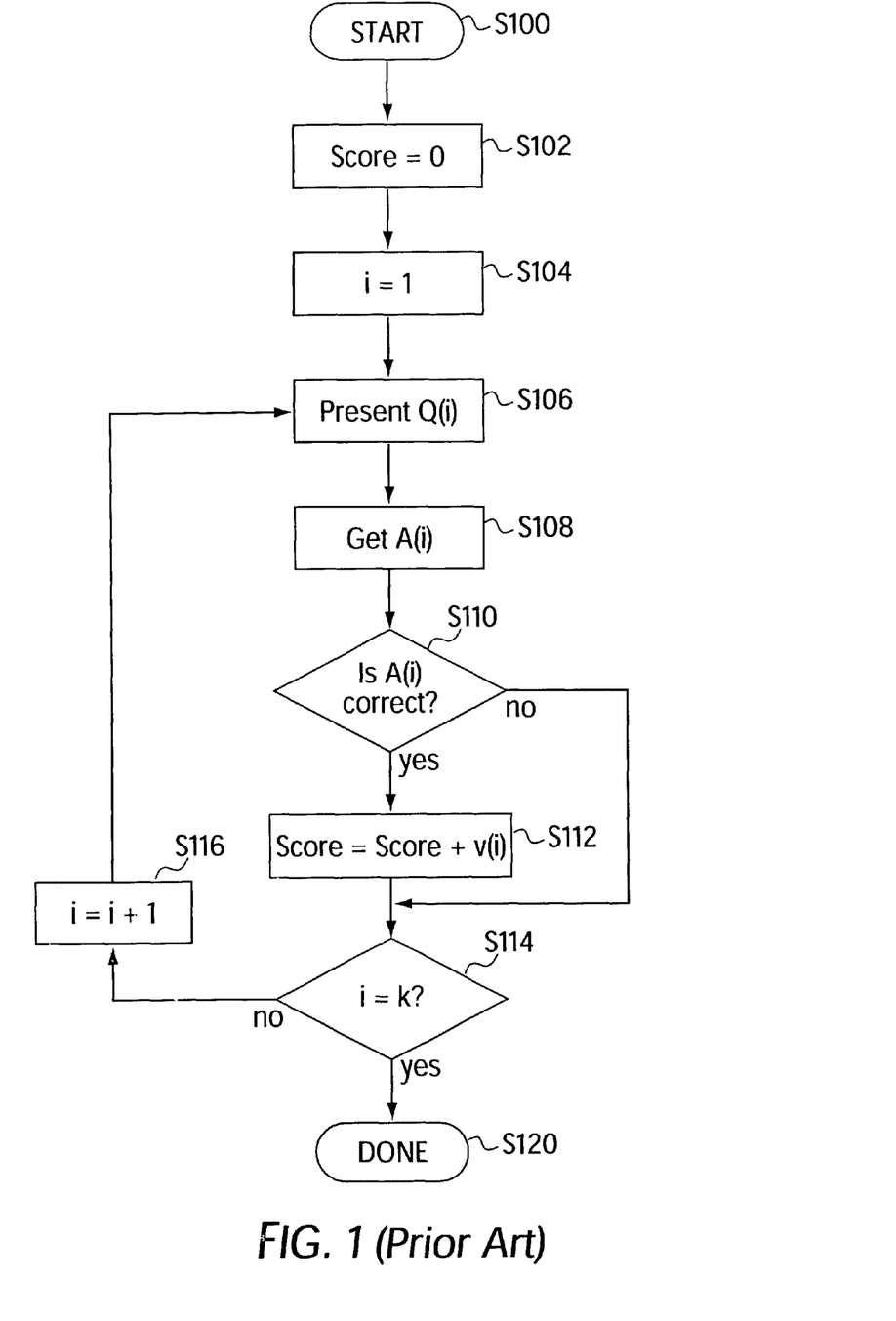
FIG. 1 is a flowchart of a prior art testing method.

A common prior art testing method is illustrated, for example, in FIG. 1. The testing method shown in FIG. 1 may be computer-administered. In the method illustrated in FIG. 1, the method is started in step S100, during which initialization and start-up sequences may be performed. The step S100 may also include steps of gathering and recording such information as the test-taker's name, address and other identifying information. In addition, the step S100 may include a step of selecting a particular one of several available tests stored in, for example, a computer memory device, such as a CD-ROM, a DVD-ROM, a magnetic medium or the like.

Thereafter, in step S102, the value of the variable Score is initialized so that Score=0, and in step S104, the value of the question counter i is initialized so that i=1. In the step S106, the question Q(i) corresponding to the value of the question counter i is presented to the test-taker. The questions may be presented to the test-taker by, for example, displaying the questions on a displaying device. The questions may be in the form of, for example, true-false questions, multiple choice questions or any other of the myriad of question types known in the art or any combination of the foregoing. The questions may be stored in a computer database, CD-ROM, DVD-ROM or the like and may be presented in a predetermined sequence or in a random sequence. The question may be stored locally or may be remotely stored and accessed, for example, via the Internet.

Thereafter, in step S108, the test-taker enters his answer A(i) corresponding to the question Q(i) presented in step S106. The test-taker may enter his answer by, for example, keyboard entry, mouse entry, touch-screen entry, voice recognition data acquisition or the like. Thereafter, in step S110 it is determined whether the answer A(i) is correct by comparing the answer A(i) entered by the test-taker with the known correct answer to question Q(i). If, in step S110 it is determined that the answer A(i) is correct, the value of the variable Score is incremented in step S112 by the value v(i), which may be different for different questions based on, for example, the type and/or relative difficulty of the question.

It is then determined in step S114 whether the value of the question counter i is equal to the value of k, the predetermined number of questions to be administered in the test. If the value of i is determined to not be equal to k, indicating that the test has not been completed, the value of the question counter i is incremented in step S116, and the method returns to step S106, where the next question Q(i) is presented. The steps S106, S108, S110, S112, S114, S116 are repeated until it is determined in step S114 that the value of the question counter i is equal to the value of k, thereby indicating that the test has been completed.

Thereafter, the step S120 is performed. The step S120 may include the steps of score recording and reporting and appropriate termination and shut-down procedures.

The foregoing prior art testing method has been heretofore applied to individually administered tests and group administered tests. In an individually administered test, the test-taker is presented with a series of standardized questions. The administrating entity scores the test based on the answers entered by the test-taker. The scoring may be calculated and reported based on sub-categories as defined in the test structure or may simply be a scalar value representing the test-taker's score.

In a group administered test, the test-taker's score is calculated based on the number of correct answers. The number of incorrect answers may also be a component of the score. The score is calculated using various algorithms known in the art.

The aforementioned testing method is considered to be a linear method. That is, the questions are presented in order, either in a predefined sequence or a random sequence, until the predetermined number of questions have been answered. The method described above is rigid, in that it cannot accommodate various skill or aptitude levels within the test regimen, other than reflecting these levels within the final score. The final score is conventionally represented as a single scalar number (i.e., a "total" score) or as a series of scalar numbers, each representing a "total" score in a series of subject areas. This type of conventional scoring is merely an attempt to locate each individual at some ordinate. These scalar values, however, do not provide any significant information regarding the individual or that individual's skill level. It is, therefore, an object of the present invention to provide an adaptive evaluation method and an adaptive evaluation apparatus.

SUMMARY

The above and other beneficial objects of the present invention are most effectively attained by providing an evaluation method and an evaluation apparatus as described and claimed herein. In one embodiment, a plurality of questions are represented in a matrix of N items in each of a number of M tracks. The questions are presented in order of increasing difficulty from a first randomly selected track. After a question is answered incorrectly, the track is changed and the next question presented is of lesser difficulty than the question answered incorrectly. After a predetermined number of track changes, the evaluation is considered completed after a predetermined number of questions have been answered incorrectly. The method may be embodied in a computer readable medium or may be embodied in a computer system.

DETAILED DESCRIPTION

Those skilled in the art will gain an appreciation of the present invention when viewed in conjunction with the accompanying drawings of FIGS. 1 through 6, inclusive. The individual reference characters designate the same or similar elements throughout the several views.

Figure 2:
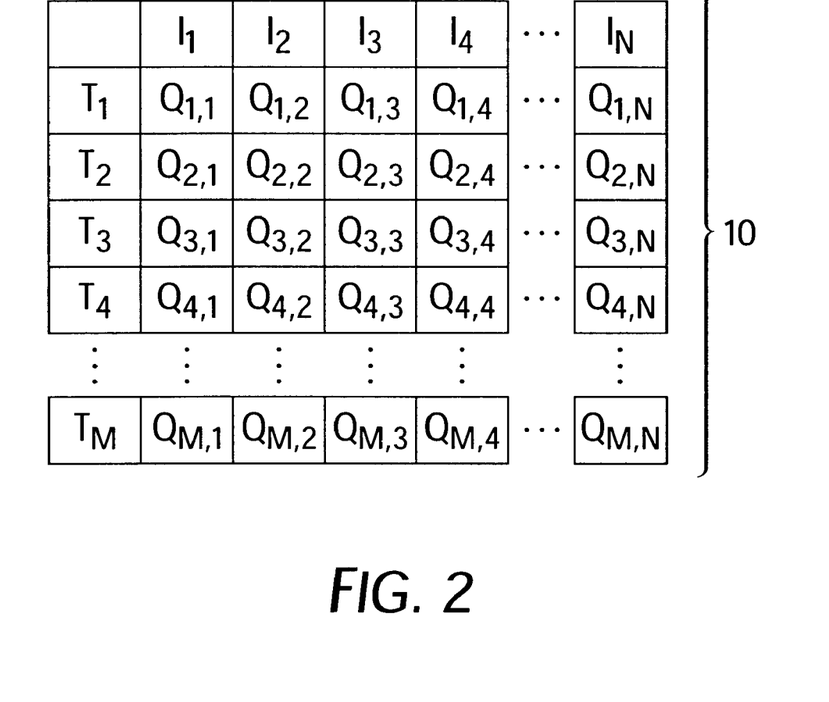
FIG. 2 is a schematic view of a memory architecture storing a plurality of evaluation questions used in an evaluation method and an evaluation apparatus according to the present invention.

Referring now to FIG. 2, there is seen a schematic view of a memory architecture (M, N) 10 storing a plurality of questions to be administered by the evaluation method and the evaluation apparatus according to the present invention. It will be appreciated that the memory architecture (M, N) 10 may be in the form of, for example, a CD-ROM, a DVD-ROM, an optical medium, a magnetic medium, a RAM, a ROM or any other type of storage medium. It will also be appreciated that the memory architecture (M, N) 10 may store the plurality of questions locally, permanently, temporarily and/or removably, on the evaluated person's computing device or may store the plurality of questions remotely so that the evaluated person accesses the memory architecture (M, N) 10 by, for example, Internet communication or other network or remote communication.

The memory architecture (M, N) 10 illustrated in FIG. 2 is represented schematically, for clarity and understanding, as a two-dimensional array or matrix, although the memory architecture (M, N) 10 is in no way limited to the schematic representation shown. The array shown in FIG. 2 includes M rows of tracks $T_1 \ldots T_M$ and N columns of items $I_1 \ldots I_N$. Thus, the memory architecture (M, N) 10 is an M×N matrix representing questions $Q_{1,1} \ldots Q_{M,N}$ or $Q(1, 1) \ldots Q(M, N)$. The formats $Q_{M,N}$ and $Q(M, N)$ are used herein interchangeably. The questions $Q_{1,1} \ldots Q_{M,N}$ may be, for example, multiple choice questions, true-false questions or any other of the myriad types of questions or any combination thereof.

Figure 3:
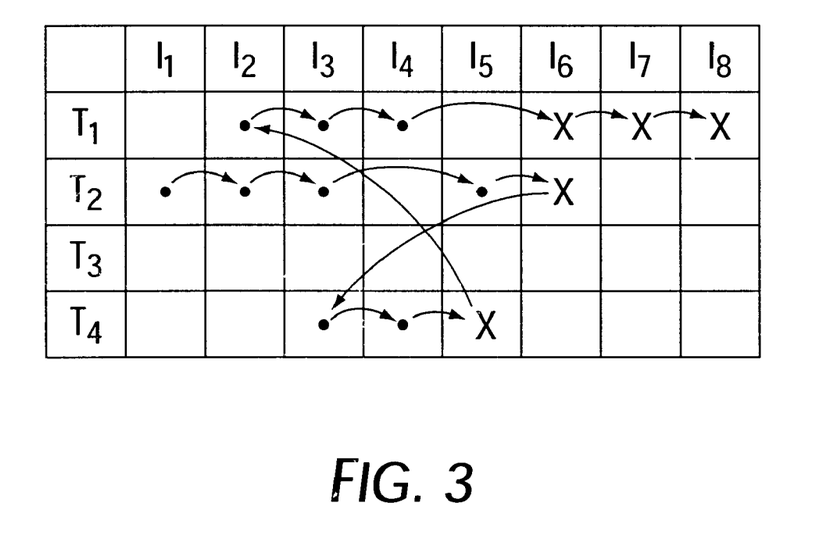
FIG. 3 is a schematic view of an embodiment memory architecture of the present invention.

Referring now to FIG. 3, there is seen an embodiment memory architecture (M, N) 10, which includes four tracks $T_1 \ldots T_4$ and eight items $I_1 \ldots I_8$, defining a 4×8 matrix. It should be understood that the embodiment memory architecture (M, N) 10 illustrated in FIG. 3 is merely exemplary and that memory architecture (M, N) 10 may include any number of tracks and any number of items.

Figure 4:
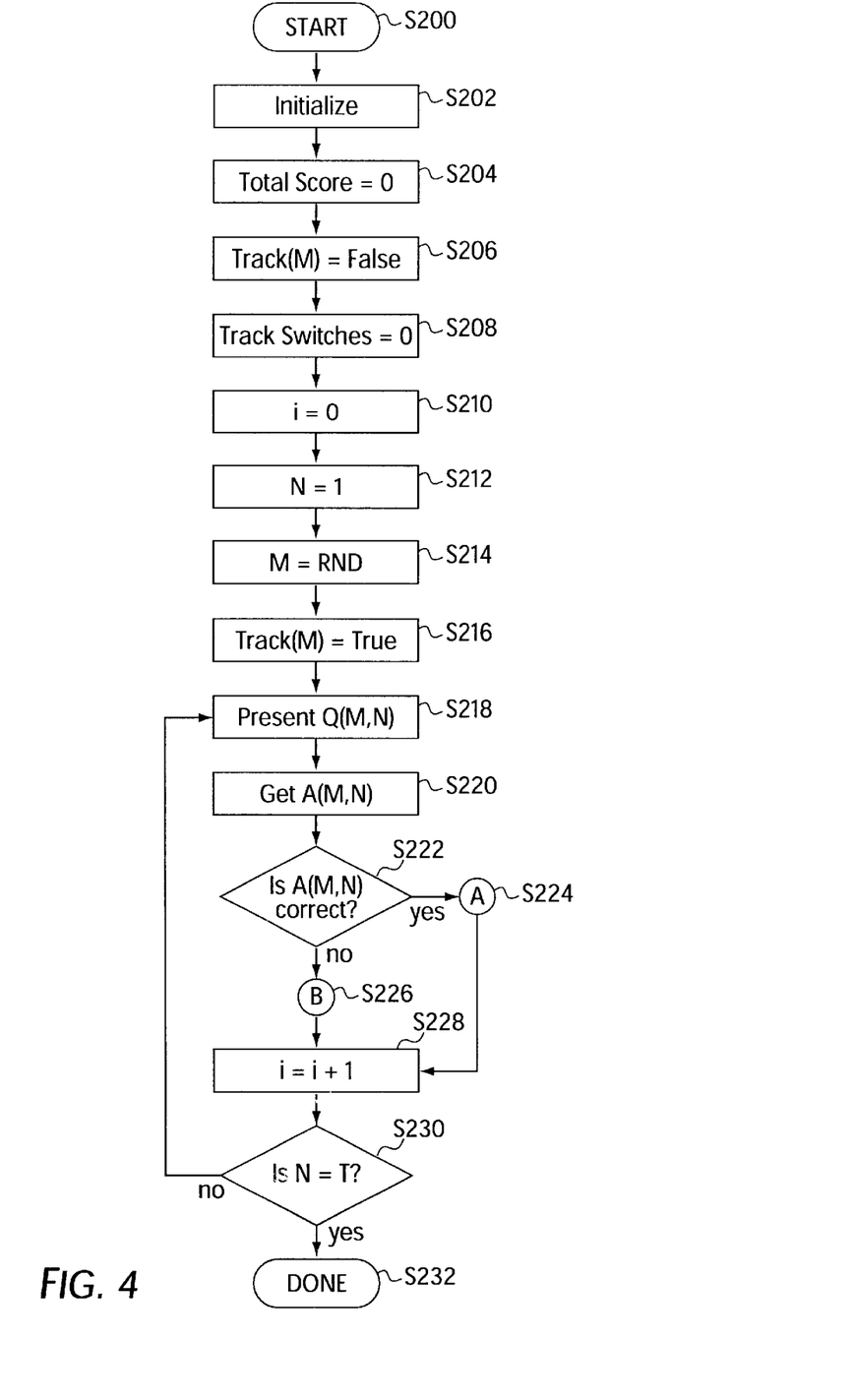
FIG. 4 is a flowchart of the evaluation method of the present invention.

Referring now to FIG. 4, there is seen a flowchart of the evaluation method of the present invention. The method is started in step S200, and initialization is performed in step S202. The initialization step S202 may include such steps as acquiring and storing identifying information from the evaluated person, selecting one of a plurality of available evaluation subjects or regimens, variable initialization and the like.

Thereafter, in step S204, the variable TotalScore is initialized so that TotalScore=0. Similarly, in step S206, the elements of the one-dimensional array Track(m) are initialized so that Track(m)=FALSE for all valid values of m, that is, 1 to $M_{max}$. Each element of the array Track(m) stores a boolean value of TRUE (1) or FALSE (0) to indicate whether the track m has been used. In step S208, the variable TrackSwitches is initialized so that TrackSwitches=0. The variable TrackSwitches indicates the number of times the track has been changed or switched, as described hereinbelow. The question counter i is initialized in step S210 so that i=0, and the item counter N is initialized in step S212 so that N=1.

After these variable initialization steps, one of the tracks is randomly selected in step S214 by assigning to the variable M so that M=RND, wherein RND represents a random integer between 1 and $M_{max}$. In step S216, the element Track(M) is assigned Track(M)=TRUE, which will later be used to prevent the track M from being used subsequently. In step S218, the question Q(M, N) is presented to the evaluated person. The question Q(M, N) may be presented by, for example, displaying the question Q(M, N) on a displaying device of the evaluated person's computing device. Thereafter, in step S220, the evaluated person's answer A(M, N) to question Q(M, N) is acquired by, for example, keyboard entry, mouse entry, touch-screen entry, voice-recognition data acquisition or the like. Thereafter, in step S222, it is determined whether the answer A(M, N) acquired in step S220 to question Q(M, N) presented in step S218 is correct. If it is determined in step S222 that the answer A(M, N) to question Q(M, N) is correct, the method proceeds to step S224, which is more fully described in FIG. 5. If it is determined in step S222 that the answer A(M, N) to question Q(M, N) is incorrect, the method proceeds to step S226, which is more fully described in FIG. 6. After either step S224 or S226 is performed, step S228 is performed, in which the question counter i is incremented so that i=i+1. Thereafter, in step S230 it is determined whether the value of N is equal to the value of T. which represents the total number of items. If the value of N is determined to be equal to the value of T in step S230, the step S232 is performed, which terminates the method and performs any necessary shut-down, data recording and score reporting operations or the like. If the value of N is determined to not be equal to the value of T in step S230, the method returns to step S218 to present the next question Q(M, N).

Figure 5:
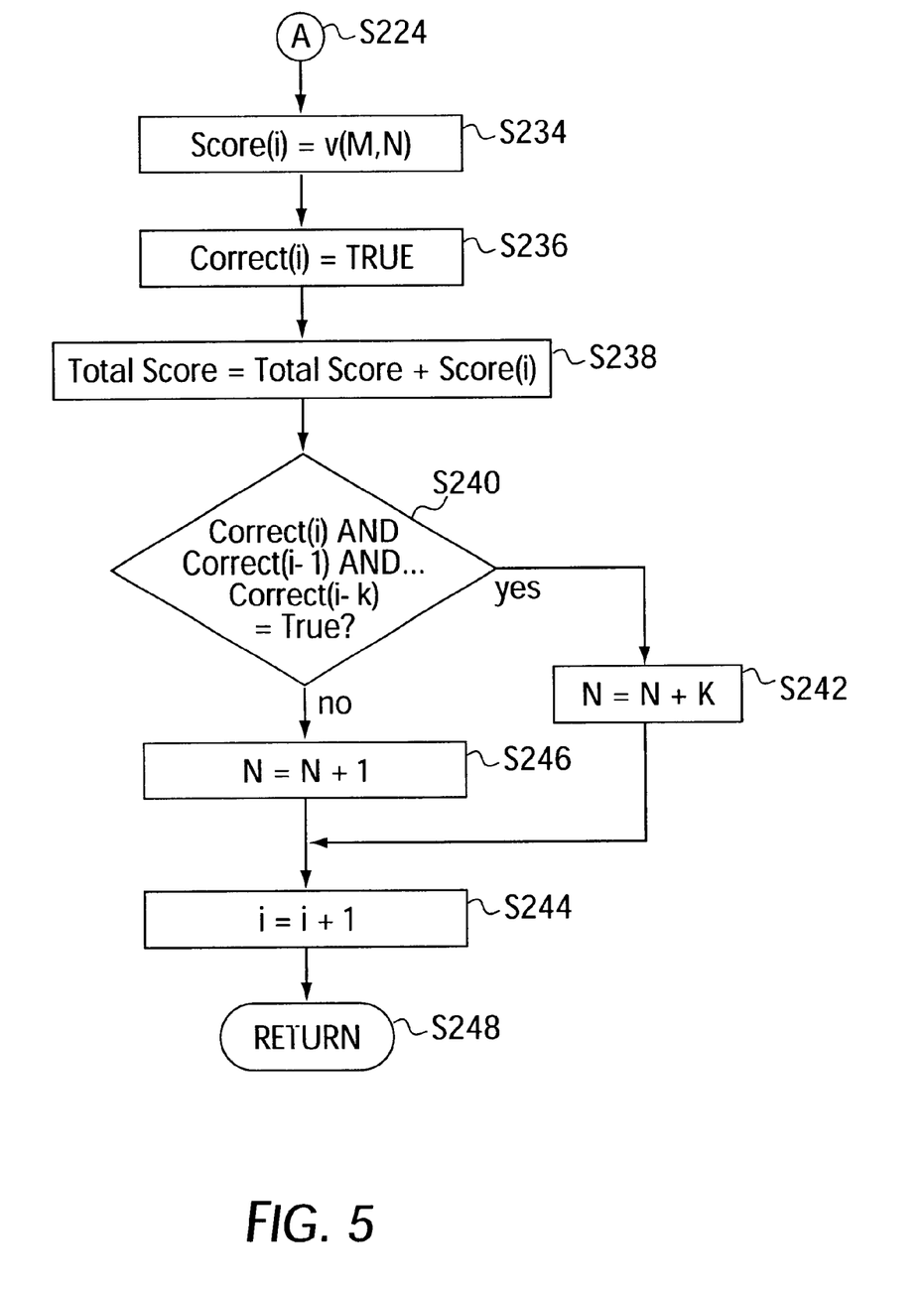
FIG. 5 is a further flowchart of the evaluation method of the present invention.

Referring now to FIG. 5, there is seen a flowchart of the method step S224, which is performed after it is determined in step S222 that the answer A(M, N) to question Q(M, N) is correct. In step S234 the value of Score(i) is assigned so that Score(i)=v(M, N), wherein v(M, N) represents the value of the correct answer to the question Q(M, N). The value of v(M, N) may be based on, for example, the type and/or relative difficulty of the question Q(M, N). It will be appreciated that all questions Q(M, N) for any given N are preferably of substantially equal difficulty. That is, all questions Q(M, N) in any given column of the memory architecture 10 illustrated in FIGS. 1 and 2 are of substantially equal difficulty.

Thereafter, in step S236, the value of the boolean variable Correct(i) is assigned so that Correct(i)=TRUE, which will later be used to determine whether each of a sequence of questions were answered correctly or incorrectly. Thereafter, in step S238, the value of TotalScore is assigned so that TotalScore=TotalScore+Score(i).

Thereafter, in step S240, it is determined whether k number of questions have been answered correctly. Step S240 may be performed using an AND operation, such as:

$$\text{Correct}(i) \text{ AND } \text{Correct}(i-1) \text{ AND } \ldots \text{Correct}(i-k+1) \qquad (1)$$

If it is determined in step S240 that k number of questions have been answered correctly, that is, if the expression (1) above is evaluated as TRUE, the value of N is incremented by assigning to N so that N=N+K in step S242, thereby jumping forward K number of questions. If it is determined in step S240 that k number of questions have not been answered correctly, then the value of N is incremented by assigning to N so that N=N+1 in step S246. After either of step S242 or step S246 is performed, step S244 is performed in which the value of question counter i is incremented so that i=i+1. Thereafter, control is returned in step S248.

Figure 6:
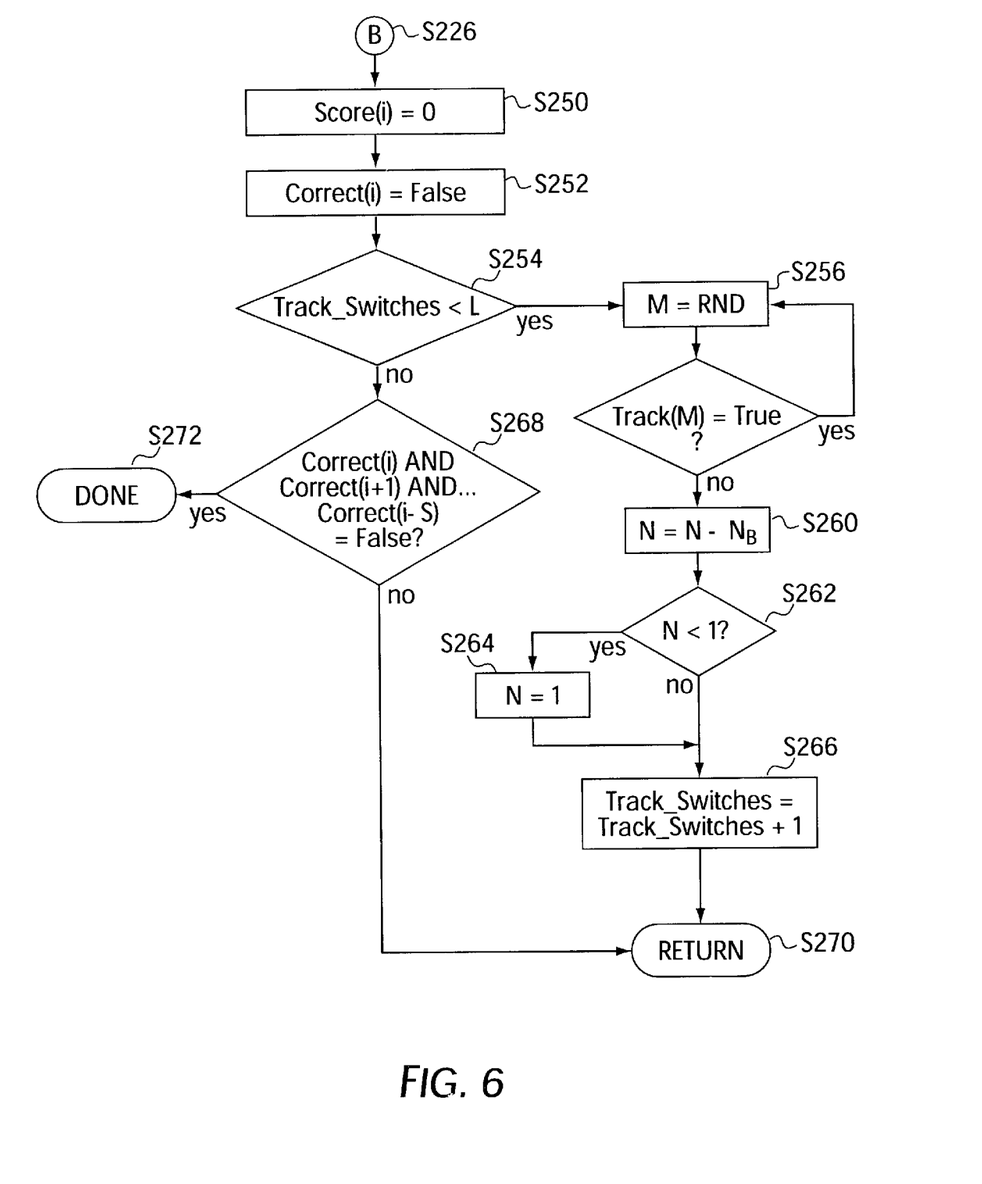
FIG. 6 is yet another flowchart of the evaluation method of the present invention.

Referring now to FIG. 6, there is seen a flowchart of the method step S226, which is performed after it is determined in step S222 that the answer A(M, A) to question Q(M, N) is incorrect. In step S250, the value of Score(i) is assigned so that Score(i)=0. Thereafter, the value of Correct(i) is assigned in step S252 so that Correct(i)=FALSE. Thereafter, in step S254, it is determined whether the number of track changes as represented by TrackChanges is less than a predetermined value L. If the number of track changes TrackChanges is determined to be less than the value of L, a new track M is randomly selected in step S256. In step S258, it is determined whether the newly selected track Mhas been previously used by determining whether the value of Track(M) is TRUE. If it is determined in step S258 that the newly selected track M has previously been used, step S256 is performed again to randomly select yet another new track M. The steps S256 and S258 are repeated until the newly selected track M, randomly selected in step S256, has not been previously used. Thereafter, in step S260, the value of the item counter N is decremented by the value of $N_B$, thereby moving back in the question sequence in the newly selected track. In step S262, it is determined whether the item counter N as decremented in steps S260 is less than 1 and, if so, the value of N is assigned so that N=1, which is the lowest valid value of N. Thereafter, in step S266, the value of TrackSwitches is incremented so that TrackSwitches=TrackSwitches+1. Control is then returned in step S270 to the main routine shown in FIG. 4.

If it is determined in step S254 that the number of track switches TrackSwitches is not less than the value of L, thereby indicating that the maximum permissible number of track changes has been performed, it is determined in step S268 whether S number of questions have been answered incorrectly in sequence. The determination performed in step S268 may be performed by evaluating the expression:

$$\text{Correct}(i) \text{ AND Correct}(i-1) \ldots \text{Correct}(i-S+1) \text{ Correct}(i) \qquad (2)$$

If the expression (2) is evaluated to be FALSE, it is determined in step S268 that S number of questions have been answered incorrectly in sequence. Then step S272 is performed, in which the appropriate termination steps are performed, such as those performed in step S232, described hereinabove. If it is determined in step S268 that S number of questions have not been answered incorrectly in sequence, then control is returned in step S270 to the main routine shown in FIG. 4.

The foregoing method will be further described with reference to the exemplary embodiment illustrated in FIG. 3. As described above, the memory architecture (M, N) 10 shown in FIG. 3 consists of four tracks $T_1 \ldots T_4$ and eight items $I_1 \ldots I_8$ in each of the tracks $T_1 \ldots T_4$. The method is started in step S200 as described above, and the steps S202, S204, S206, S208, S210 and S212 are thereafter performed as also described above. In step S206, the values of each element Track(m) is initialized, for m=1 to 4. In step S214, the value of M is randomly assigned. As can be seen in FIG. 3, the value of M is randomly assigned the value of 2, corresponding to the second track $T_2$. Thereafter, in step S216 the value of the element Track(2) is assigned so that Track(2)=TRUE, thereby indicating that the second track $T_2$ will not be available subsequently for a track change. In step S218, the question Q(2, 1) is presented, and, thereafter in step S220, the answer A(2, 1) is acquired. In the example illustrated in FIG. 3, the question Q(2, 1) is correctly answered, and, therefore, in step S222 it is determined that A(2, 1) is correct, thereby performing the step S224. In step S234, the value of Score(l) is assigned so that Score(1)=v(2, 1). For simplicity, the value of v(M, N) will be 1 for all questions. Thus, in step S234, the value of Score(1) is assigned so that Score(1)=1.

Thereafter, in step S236, the value of the element Correct (1) is assigned so that Correct(1)=TRUE, and in step S238, the value of TotalScore in incremented by the value of Score(1). At this stage, the value of TotalScore=1. In the example illustrated in FIG. 3, the value of k is assigned so that k=3. Since only one question has been presented, the determination of step S240 returns a FALSE value, thereby causing step S246 to be performed to increment N so that N=2. Returning in step S248 to the main routine shown in FIG. 4, the step S228 is performed, in which the question counter i is incremented so that i=1 to indicate that one question has been answered. It is determined in step S230 that the total number of questions T have not been answered, thereby returning to step S218 to present the next question Q(2, 2).

In the example illustrated in FIG. 3, the question Q(2, 2) is also answered correctly. The method then progresses as described above with respect to question Q(2, 1). The next question Q(2, 3) is presented and also answered correctly. Since three questions have been answered correctly in sequence, the determination made in step S240 returns TRUE. That is Correct(3) AND Correct(2) AND Correct (1)=TRUE, thereby causing step S242 to be performed. In the exemplary embodiment illustrated in FIG. 3, the value of K 2, thereby assigning to N so that N 5, effectively skipping question Q(2, 4). The method progresses to present question Q(2, 5), which is answered correctly, and then to present question Q(2, 6), which is answered incorrectly.

Because question Q(2, 6) is answered incorrectly, the method proceeds to step S226. The value of Correct(5) is assigned so that Correct(5)=FALSE, indicating that the fifth question, which is question Q(2, 6), was answered incorrectly. In the exemplary embodiment, L, the maximum number of track switches, is assigned so that L=2. Since TrackSwitches=0 at this stage, the method proceeds to step S256, in which the value of M is randomly selected so that M=4, indicating that the next track will be track $T_4$. In the exemplary embodiment illustrated in FIG. 3, the value of $N_B$ is assigned so that $N_B$=3, indicating that after a track change, the next question presented will be three before the most recent question answered incorrectly. Thus, at this stage, after answering question Q(2, 6) incorrectly, M=4 and N=3. In step S266, the value of TrackSwitches is incremented so that TrackSwitches=1, indicative of the fact that the first track switch has occurred. Returning in step S270 to the main routine shown in FIG. 4, the next question Q(4, 3) is presented.

Following the progression of questions shown in FIG. 3, questions Q(4, 3) and Q(4, 4) are presented and answered correctly. However, question Q(4, 5) is answered incorrectly, thereby invoking another track change. The second track change causes track $T_1$ to be used, beginning with question Q(1, 2), three questions back from the last incorrectly answered question Q(4, 5). The process continues, presenting questions Q(1, 2), Q(1, 3) and Q(1, 4), which are all answered correctly. Since three questions were answered sequentially, the question Q(1, 5) is skipped and question Q(1, 6) next presented. Question Q(1, 6) is answered incorrectly. In the exemplary embodiment illustrated in FIG. 3, the maximum track changes permitted, as represented by the value of L, is two, which, as seen in FIG. 3 has, at this stage, occurred, no further track changes are performed. In the exemplary embodiment illustrated in FIG. 3, the value of S is assigned to that S=3. Since at this stage, three questions have not been answered incorrectly in sequence, the next question Q(1, 7) is presented. The question Q(1, 7) is also answered incorrectly, causing the next question Q(1, 8) to be presented. Question Q(1, 8) is also answered incorrectly. At this stage S number of questions, that is, three questions, have been answered incorrectly in sequence, thereby terminating the method by performing step S272.

In a preferred embodiment of the present invention, each of the questions Q(M, N) is further defined by an evaluation structure, which includes a base or prime question $Q_p(M, N)$ and a series of subcomponents $Q_{s1}(M, N) \ldots Q_{sx}(M, N)$. Each of the subcomponents $Q_{s1}(M, N) \ldots Q_{sx}(M, N)$ represents an alternate presentation, or "hint," of the respective prime question $Q_p(M, N)$. For example, a prime question may presented as:

2+5=?

where the evaluated person must insert the correct number at the "?". In the prior art testing method described above, if the test-taker entered an incorrect number at the "?", the answer would be considered "wrong" and the next question would be subsequently presented. However, according to the present evaluation method, if an incorrect number was entered at the "?" above, the following subcomponent would be presented:

$$\begin{array}{r} 2 \\ +5 \\ \hline ? \end{array}$$

The evaluated person would again be required to insert his answer at the "?". If an incorrect answer were entered at the "?", a further subcomponent may be presented. In the foregoing example, a further subcomponent may be, for example, a picture of seven balls, the evaluated person being asked to identify the total number of balls.

It should be appreciated that by presenting a question based on a prime question and a series of subcomponents, the zone of proximal development of the evaluated person may be measured. Instead of presenting a scalar "score," as is usually done in the prior art testing method described above, the results presented in the evaluation method according to the present invention are in the form of a vector indicative of the proximal development of the evaluated person. Preferably, the results are in the form of a narrative, which is developed based on whether the prime question or one of the subcomponents was answered correctly and on which of the series of subcomponents was answered correctly. It will be apparent that the narrative may be developed from narrative components stored in a database. Such narrative components may be sentence fragments that are assembled to form the narrative.

Based on the foregoing example, if the prime question "2+5 =?" is answered correctly, the narrative might read, "Mr. Smith understands the concept of adding two integers." If however, the prime question is answered incorrectly but the first subcomponent is answered correctly, the narrative might read, "Mr. Smith understands the concept of adding two integers but appears to have some difficulty." Furthermore, if the prime question and first subcomponent are answered incorrectly but the second subcomponent is answered correctly, the narrative might read, "Mr. Smith has difficulty adding two integers but seems to understand the general concept of addition." If the prime question and all of the corresponding subcomponents are answered incorrectly, the narrative might read, "Mr. Smith appears to have difficulty with addition."

Of course, the present invention is in no way limited to the foregoing exemplary embodiment. It will be apparent to those skilled in the art that the evaluation method of the present invention may be applied to any subject matter or combination thereof, including, but in no way limited to mathematical subjects and the language arts. The evaluation method of the present invention may also be applied to measure physical development or to measure visual or hearing abilities. The evaluation method may further be applied to measure speaking abilities, vocabulary development, cognitive and reasoning skills, decision-making skills or the like.

It will be appreciated that the foregoing method may be computer-controlled and that the method may be stored in a computer-readable medium as a set of instructions performed by a processor. The computer-readable medium may be, for example, a magnetic medium, optical medium, magneto-optical medium, CD-ROM, DVD-ROM, RAM or ROM or the like.

Thus, the several aforementioned objects and advantages of the present invention are most effectively attained. Those skilled in the art will appreciate that many modifications of the preferred embodiment described hereinabove may be made without departing from the spirit and scope of the invention. Although a single preferred embodiment of the invention has been described and disclosed in detail herein, it should be understood that this invention is in no sense limited thereby and that its scope is to be determined by that of the appended claims.

What is claimed is:

1. An evaluation method for presenting a plurality of items, each item representing a question, the items selected from a matrix of a plurality of N tracks and a plurality of M tracks, the method comprising the steps of:
   (a) selecting one of the M tracks;
   (b) presenting the questions in a predetermined order from the selected one of the M tracks selected in the selecting step (a) and receiving an answer in response to and corresponding to each question presented;
   (c) determining whether a first condition is satisfied in accordance with the questions presented and answers received in the step (b),
   (d) selecting another one of the M tracks when the first condition is determined to be satisfied in the step (c);
   (e) presenting the questions in a predetermined order from said selected another one of the M tracks selected In the selecting step (d) and receiving an answer in response to and corresponding to each question presented;
   (f) determining whether a second condition is satisfied in accordance with the questions presented and answers received in the step (e); and
   (g) if it is determined in the step (f) that the second condition is satisfied, repeating the steps (d), (e) and (f) until a third condition is determined to be satisfied.

2. The method according to claim 1, wherein the first condition is defined by receiving an incorrect answer to one of the questions presented in the presenting step (b).

3. The method according to claim 2, wherein the second condition is defined by receiving an incorrect answer to one of the questions presented in the presenting step (e).

4. The method according to claim 1, wherein the third condition is defined by receiving an incorrect answer to each of a sequence of questions presented in the presenting step (e).

5. The method according to claim 1, further comprising the step of skipping a predetermined number of questions in the selected track in response to a fourth condition.

6. The method according to claim 5, wherein the fourth condition is defined by receiving a correct answer to each of a sequence of questions presented in one of the presenting steps (b) and (e).

7. The method according to claim 1, wherein the selecting step (d) includes the steps of:

determining whether the another one of the M tracks selected was previously selected in one of the selected steps (a) and (d); and repeating the selecting step (d) until the determining step determines that the another one of the M tracks selected was not previously selected in one of the selecting steps (a) and (d).

8. The method according to claim 1, wherein the third condition is defined by receiving a predetermined number of incorrect answers to the questions presented in the presenting step (e).

9. The method according to claim 1, wherein the third condition is defined by receiving a predetermined number of incorrect answers in sequence to the questions presented in the presenting step (e).

10. The method according to claim 1, wherein the selected one of the M tracks selected in the selecting step (a) is selected randomly.

11. The method according to claim 1, wherein the selected another one of the M tracks selected in the selecting step (d) is selected randomly.

12. The method according to claim 1, wherein the questions presented in the presenting step (b) are presented in order of increasing difficulty.

13. The method according to claim 12, wherein the questions presented in the presenting step (e) are presented in order of increasing difficulty.

14. The method according to claim 1, wherein selecting step (d) includes a step of selecting a new item level different from the item level at which the second condition occurred.

15. The method according to claim 14, wherein the new item level represents a question of lesser difficulty than the item level at which the second condition occurred.

16. The method according to claim 1, wherein each of the questions comprises a prime question and at least one subcomponent, the presenting and receiving step (b) comprising the substeps of:

presenting the prime question;
receiving an answer in response to the prime question; and
presenting each of the at least one subcomponents if the answer received in response to the prime question presented is incorrect; and
receiving an answer in response to each subcomponent presented; and the presenting and receiving step (e) comprising the substeps of:
presenting the prime question;
receiving an answer in response to the prime question; and
presenting each of the at least one subcomponents if the answer received in response to the prime question presented is incorrect; and
receiving an answer in response to each subcomponent presented.

17. The method according to claim 1, further comprising the step of developing a narrative result based on the questions presented and the answers received.

18. The method according to claim 17, wherein the developing step includes a step of assembling a series of narrative components stored in a database in accordance with the questions presented and the answers received.

19. A computer-readable storage medium storing a set of instructions, the set of instructions capable of being executed by a processor to implement an evaluation method for presenting a plurality of items, each item representing a question, the items selected from a matrix of a plurality of N tracks and a plurality of M tracks, the set of instructions performing the steps of:

(a) selecting one of the M tracks;
(b) presenting the questions in a predetermined order from the selected one of the M tracks selected in the selecting step (a) and receiving an answer in response to and corresponding to each question presented;
(c) determining whether a first condition is satisfied in accordance with the questions presented and answers received in the step (b);
(d) selecting another one of the M tracks when the first condition is determined to be satisfied in the step (c);
(e) presenting the questions In a predetermined order from said selected another one of the M tracks selected in the selecting step (d) and receiving an answer in response to and corresponding to each question presented;
(f) determining whether a second condition is satisfied in accordance with the questions presented and answers received in the step (e); and
(g) if it is determined in the step (f) that the second condition is satisfied, repeating the steps (d), (e) and (f) until a third condition is determined to be satisfied.

20. The computer-readable medium according to claim 19, wherein the first condition is defined by receiving an incorrect answer to one of the questions presented in the presenting step (b).

21. The computer-readable medium according to claim 20, wherein the second condition is defined by receiving an incorrect answer to one of the questions presented in the presenting step (e).

22. The computer-readable medium according to claim 19, wherein the third condition is defined by receiving an incorrect answer to each of a sequence of questions presented in the presenting step (e).

23. The computer-readable medium according to claim 19, wherein the set of instructions further performs the step of skipping a predetermined number of questions in the selected track in response to a fourth condition.

24. The computer-readable medium according to claim 23, wherein the fourth condition is defined by receiving a correct answer to each of a sequence of questions presented in one of the presenting steps (b) and (e).

25. The computer-readable medium according to claim 19, wherein the selecting step (d) includes the steps of
determining whether the selected another one of the M tracks selected was previously selected in one of the selected steps (a) and (d); and
repeating the selecting step (d) until the determining step determines that the selected another one of the M tracks selected was not previously selected in one of the selecting steps (a) and (d).

26. The computer-readable medium according to claim 19, wherein the third condition is defined by receiving a predetermined number of incorrect answers to the questions presented in the presenting step (e).

27. The computer-readable medium according to claim 19, wherein the third condition is defined by receiving a predetermined number of incorrect answers in sequence to the questions presented in the presenting step (e).

28. The computer-readable medium according to claim 19, wherein the selected one of the M tracks selected in the selecting step (a) is selected randomly.

29. The computer-readable medium according to claim 19, wherein the selected another one of the M tracks selected in the selecting step (d) is selected randomly.

30. The computer-readable medium according to claim 19, wherein the questions presented in the presenting step (b) are presented in order of increasing difficulty.

31. The computer-readable medium according to claim 30, wherein the questions presented in the presenting step (e) are presented in order of increasing difficulty.

32. The computer-readable medium according to claim 19, wherein selecting step (d) includes a step of selecting a new item level different from the item level at which the second condition occurred.

33. The computer-readable medium according to claim 32, wherein the new item level represents a question of lesser difficulty than the item level at which the second condition occurred.

34. The computer-readable medium according to claim 19, wherein each of the questions comprises a prime question and at least one subcomponent, the presenting and receiving step (b) comprising the substeps of:
   presenting the prime question;
   receiving an answer in response to the prime question; and
   presenting each of the at least one subcomponents if the answer received in response to the prime question presented is incorrect; and
   receiving an answer in response to each subcomponent presented;
and the presenting and receiving step (e) comprising the substeps of:
   presenting the prime question;
   receiving an answer in response to the prime question; and
   presenting each of the at least one subcomponents if the answer received in response to the prime question presented is incorrect; and
   receiving an answer in response to each subcomponent presented.

35. The computer-readable medium according to claim 19, wherein the method further comprises the step of developing a narrative result based on the questions presented and the answers received.

36. The computer-readable medium according to claim 35, wherein the developing step includes a step of assembling a series of narrative components stored in a database in accordance with the questions presented and the answers received.

37. A computer system, comprising:
   a memory;
   an input device;
   an output device; and
   an evaluation method for presenting a plurality of items, each item representing a questions, the Items selected from a matrix of a plurality of N tracks and a plurality of M tracks, the method comprising the steps of:
   (a) selecting one of the M tracks;
   (b) presenting the questions in a predetermined order from the selected one of the M tracks selected in the selecting step (a) and receiving an answer in response to and corresponding to each question presented;
   (c) determining whether a first condition is satisfied in accordance with the questions presented and answers received in the step (b);
   (d) selecting another one of the M tracks when the first condition is determined to be satisfied in the step (c);
   (e) presenting the questions in a predetermined order from said selected another one of the M tracks selected in the selecting step (d) and receiving an answer in response to and corresponding to each question presented;
   (f) determining whether a second condition is satisfied in accordance with the questions presented and answers received in the step (e); and
   (g) if it is determined in the step (f) that the second condition is satisfied, repeating the steps (d), (e) and (f) until a third condition is determined to be satisfied.

38. The computer system according to claim 37, wherein the first condition is defined by receiving an incorrect answer to one of the questions presented in the presenting step (b).

39. The computer system according to claim 38, wherein the second condition is defined by receiving an incorrect answer to one of the questions presented in the presenting step (e).

40. The computer system according to claim 37, wherein the third condition is defined by receiving an incorrect answer to each of a sequence of questions presented in the presenting step (e).

41. The computer system according to claim 37, wherein the method further comprises the step of skipping a predetermined number of questions in the selected track in response to a fourth condition.

42. The computer system according to claim 41, wherein the fourth condition is defined by receiving a correct answer to each of a sequence of questions presented in one of the presenting steps (b) and (e).

43. The computer system according to claim 37, wherein the selecting step (d) includes the steps of:
   determining whether the selected another one of the M tracks selected was previously selected in one of the selected steps (a) and (d); and
   repeating the selecting step (d) until the determining step determines that the selected another one of the M tracks selected was not previously selected in one of the selecting steps (a) and (d).

44. The computer system according to claim 37, wherein the third condition is defined by receiving a predetermined number of incorrect answers to the questions presented in the presenting step (e).

45. The computer system according to claim 37, wherein the third condition is defined by receiving a predetermined number of incorrect answers in sequence to the questions presented in the presenting step (e).

46. The computer system according to claim 37, wherein the selected one of the M tracks selected in the selecting step (a) is selected randomly.

47. The computer system according to claim 37, wherein the selected another one of the M tracks selected in the selecting step (d) is selected randomly.

48. The computer system according to claim 37, wherein the questions presented in the presenting step (b) are presented in order of increasing difficulty.

49. The computer system according to claim 48, wherein the questions presented in the presenting step (e) are presented in order of increasing difficulty.

50. The computer system according to claim 37, wherein selecting step (d) includes a step of selecting a new item level different from the item level at which the second condition occurred.

51. The computer system according to claim 50, wherein the new item level represents a question of lesser difficulty than the item level at which the second condition occurred.

52. The computer system according to claim 37, wherein each of the questions comprises a prime question and at least one subcomponent, the presenting and receiving step (b) comprising the substeps of:

presenting the prime question;

receiving an answer in response to the prime question; and presenting each of the at least one subcomponents if the answer received in response to the prime question presented is incorrect; and receiving an answer in response to each subcomponent presented;

and the presenting and receiving step (e) comprising the substeps of:

presenting the prime question;

receiving an answer in response to the prime question; and presenting each of the at least one subcomponents if the answer received in response to the prime question presented is incorrect; and receiving an answer in response to each subcomponent presented.

53. The computer system according to claim 37, wherein the method further comprises the step of developing a narrative result based on the questions presented and the answers received.

54. The computer system according to claim 53, wherein the developing step includes a step of assembling a series of narrative components stored in a database in accordance with the questions presented and the answers received.

* * * * *